(12) United States Patent
Arnal Valero et al.

(10) Patent No.: US 10,009,962 B2
(45) Date of Patent: Jun. 26, 2018

(54) DOMESTIC APPLIANCE DEVICE

(71) Applicant: BSH Bosch und Siemens Hausgeräte GmbH, Munich (DE)

(72) Inventors: Adolfo Arnal Valero, Zaragoza (ES); Damaso Martin Gomez, Zaragoza (ES); Carmelo Pina Gadea, Zaragoza (ES); Demetrio Torrubia Marco, Zaragoza (ES)

(73) Assignee: BSH Hausgeräte GmbH, Munich (DE)

( * ) Notice: Subject to any disclaimer, the term of this patent is extended or adjusted under 35 U.S.C. 154(b) by 774 days.

(21) Appl. No.: 13/669,551

(22) Filed: Nov. 6, 2012

(65) Prior Publication Data

US 2013/0126519 A1    May 23, 2013

(30) Foreign Application Priority Data

Nov. 22, 2011   (ES) .................................. 201131871

(51) Int. Cl.
*H05B 6/12*    (2006.01)
*H05B 3/68*    (2006.01)

(52) U.S. Cl.
CPC ......... *H05B 6/1209* (2013.01); *H05B 6/1245* (2013.01); *H05B 2206/022* (2013.01); *Y02B 40/126* (2013.01)

(58) Field of Classification Search
CPC . H05B 6/1209; H05B 6/1263; H05B 2213/03
USPC .......................... 219/600, 622, 623, 624, 649
See application file for complete search history.

(56) References Cited

U.S. PATENT DOCUMENTS

| | | | | |
|---|---|---|---|---|
| 4,351,996 A * | 9/1982 | Kondo | .................... | H05B 6/062 219/448.13 |
| 4,431,892 A * | 2/1984 | White | ........................... | 219/623 |
| 6,050,176 A * | 4/2000 | Schultheis et al. | ............. | 99/339 |
| 6,630,650 B2 * | 10/2003 | Bassill | .................... | H05B 6/062 219/626 |
| 6,843,245 B2 * | 1/2005 | Roch | ..................... | F24C 15/162 126/19 M |
| 7,274,008 B2 * | 9/2007 | Arnal Valero et al. | ....... | 219/622 |
| 7,777,163 B2 * | 8/2010 | Hosoi | .................. | H05B 6/1245 219/624 |
| 8,044,328 B2 * | 10/2011 | Boss | ..................... | F24C 15/105 126/211 |
| 9,414,443 B2 * | 8/2016 | Fujinami | ................ | H05B 6/062 |
| 2002/0117497 A1 * | 8/2002 | Bassill | .................... | H05B 6/062 219/626 |
| 2003/0192881 A1 * | 10/2003 | Bassill | .................. | H05B 6/062 219/626 |
| 2005/0242088 A1 * | 11/2005 | Takada | ................... | H05B 6/062 219/635 |
| 2006/0081753 A1 * | 4/2006 | Winkler | ................... | H05B 3/74 248/346.01 |

(Continued)

*Primary Examiner* — Dana Ross
*Assistant Examiner* — Lawrence Samuels
(74) *Attorney, Agent, or Firm* — Michael E. Tschupp; Andre Pallapies; Brandon G. Braun

(57) ABSTRACT

A domestic appliance device includes at least one electronics carrier unit, at least one metallic carrier unit, and at least one plug connection unit. In order to increase operational safety and reliability, the plug connection unit is provided with at least one spacer element, which distances the electronics carrier unit and the metallic carrier unit in at least one operationally ready state, in at least one direction parallel to a plug direction of the plug connection unit.

25 Claims, 3 Drawing Sheets

(56) References Cited

U.S. PATENT DOCUMENTS

| | | | |
|---|---|---|---|
| 2006/0163244 A1* | 7/2006 | Valero | H05B 6/1263 219/621 |
| 2008/0000892 A1* | 1/2008 | Hirano et al. | 219/433 |
| 2008/0017633 A1* | 1/2008 | Hosoi | H05B 6/1245 219/624 |
| 2008/0173634 A1* | 7/2008 | Boss | F24C 15/105 219/490 |
| 2008/0185376 A1* | 8/2008 | Gagas et al. | 219/623 |
| 2008/0223852 A1* | 9/2008 | Bassill | H05B 6/062 219/647 |
| 2010/0243636 A1* | 9/2010 | Martin | H05B 3/74 219/445.1 |
| 2011/0088680 A1* | 4/2011 | Suzuki et al. | 126/1 R |
| 2011/0290787 A1* | 12/2011 | Bassill | H05B 6/062 219/627 |
| 2013/0186886 A1* | 7/2013 | Leidig et al. | 219/622 |

* cited by examiner

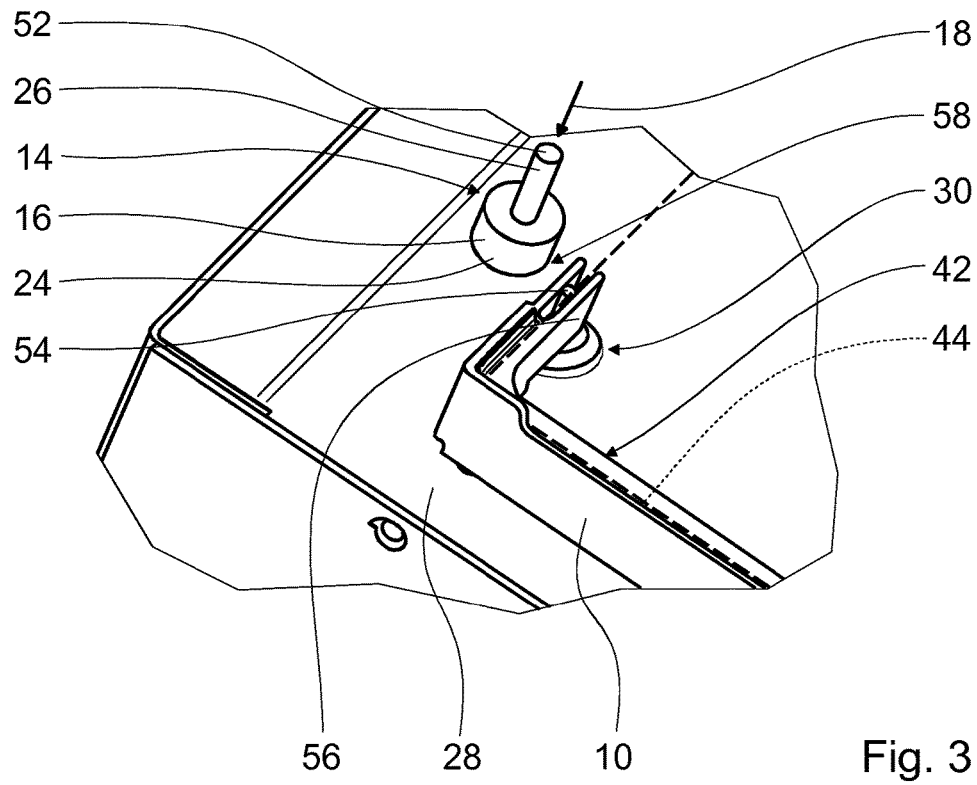
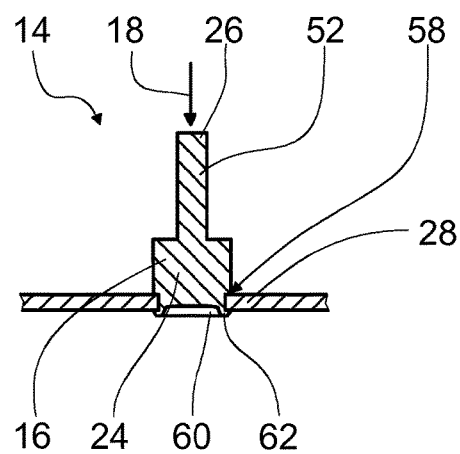
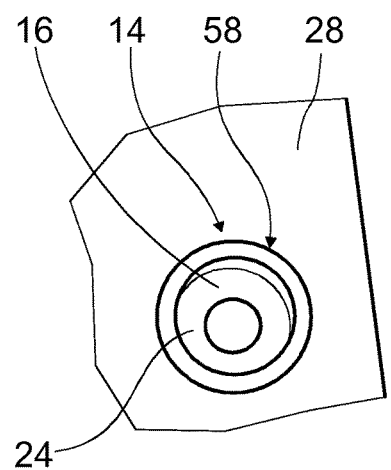

DOMESTIC APPLIANCE DEVICE

BACKGROUND OF THE INVENTION

A domestic appliance formed as an induction cooktop is known from the prior art, which exhibits a domestic appliance device with an electronics carrier unit, a metallic carrier unit for holding the inductors, and a plug connection unit for securing the metallic carrier unit.

BRIEF SUMMARY OF THE INVENTION

An object of the invention consists in particular of providing a generic domestic appliance device with advantageously increased operational safety and reliability. The object is achieved according to the invention by the features of claim 1, while advantageous embodiments and further developments of the invention can be derived from the sub-claims.

The invention is based on a domestic appliance device with at least one electronics carrier unit, at least one metallic carrier unit, and at least one plug connection unit.

It is proposed that the plug connection unit exhibits at least one spacer element, which distances the electronics carrier unit and the metallic carrier unit separated from one another in at least one operationally ready state, in at least one direction parallel to a plug direction of the plug connection unit. Preferentially, the domestic appliance device is formed as a cooktop device. The term "electronics carrier unit" should be understood to mean in particular a carrier for at least one electronics unit, differing from an electronics printed circuit board and from the metallic carrier unit. Preferentially, the electronics carrier unit consists at least partially of plastic, preferentially at least to a large part, and in particular preferably entirely of plastic, and exhibits in particular securing means for fixing the electronics unit. In particular, the electronics unit is separated by the electronics carrier unit from a domestic appliance outer housing part, wherein a minimum distance corresponds in particular at least to a distance interval defined by pertinent legal regulations and/or standards. In particular, in order to adapt to legal regulations and/or standards in different sales regions, in particular in Europe or the USA, different designs of electronics carrier units can be provided, which differ in particular in an extension parallel to the plug direction of the plug connection unit. The electronics carrier unit can in particular be formed as one piece, or, preferentially, comprise several electronics carrier elements. The term "domestic appliance outer housing part" should be understood in this connection to mean in particular a part of an outer housing of the domestic appliance. Preferentially, the domestic appliance outer housing part consists at least partially of galvanized steel. Preferentially, the electronics carrier unit encompasses the electronics unit at least partially in at least one operationally ready state. The term "securing means" should be understood to mean in particular a means which is provided for the securing of a component. In this situation, this may refer to cut-outs, in particular threaded holes, and/or elevations, in particular locking pins, and/or engagement elements and/or any type of securing means which may appear useful to the person skilled in the art. Preferentially, the securing means are formed as one piece with the electronics carrier unit. The term "one piece" should include in particular metallurgical joining, such as, for example, by a welding process and/or adhesive bonding process, etc., and, in particular advantageously, as molded on, such as by production from a casting and/or by production in a single-component or multi-component injection molding process.

The term "provided" should be understood here and hereinafter in particular as specially designed and/or equipped and/or programmed. An "electronic unit" should be understood in particular to mean a control unit and/or regulating unit and/or microprocessor unit and/or power electronics unit. The term "power electronics unit" is to be understood in particular as an electronics unit which is provided in order to operate an electrical consumer with a peak power of at least 500 W, in particular at least 1000 W, advantageously at least 1500 W, and in particular advantageously at least 2000 W, and which preferentially comprises a power converter, in particular a rectifier and/or an inverter ad/or a d.c. chopper controller and/or a frequency converter. The term "metallic carrier unit" should be understood in this connection in particular to be a unit which is provided so as to carry at least one further component, in particular at least a heating element. Preferentially, the metallic carrier unit exhibits, in order to secure the at least one further component, at least one securing means, which are particularly advantageously formed as one piece with the carrier unit. Preferentially, the metallic carrier unit consists at least partially, and for particular preference entirely, of a non-magnetic metal, in particular of aluminum. The term "non-magnetic material" should be understood in this connection to mean in particular a material with a permeability factor of maximum 1.1 and advantageously of maximum 1.0001. The metallic carrier unit, for additional insulation in relation to the electronics unit, can in particular be covered at least partially by an electrical insulator, in particular by a plastic coating and preferentially by a rubber covering. The term "heating element" should be understood in particular to mean an element which is provided in order to convert electrical energy into heat. In particular, the heating element is a resistor heater or a radiator heater, or, preferentially, an inductor, which is provided in order to convert electrical energy indirectly into heat by means of induced eddy currents.

The term "plug connection unit" should be understood here and hereinafter in particular to mean a structural unit which is different from the electronics carrier unit and the metallic carrier unit and, preferentially, also from the domestic appliance outer housing part, which is provided in order, in at least one operationally ready state of a domestic appliance, to enter into a plug connection with the metallic carrier unit and/or the electronics carrier unit. Preferentially the plug connection unit comprises at least one plug element, which in at least one operationally ready state, interacts with a plug element of a further structural component, in particular the metallic carrier unit. The plug connection unit is also provided in particular to fix the metallic carrier unit and the electronics carrier unit relative to one another in a direction perpendicular to the plug direction. Preferentially, the plug connection unit consists at least partially of special steel. The plug connection unit can in particular comprise several structural elements, which in particular can in each case also be formed as one piece with a further structural unit, in particular the metallic carrier unit or the electronics carrier unit, or also a further structural component, in particular the domestic appliance outer housing part. For preference, however, the plug connection unit is formed as one piece.

The term "spacer element" of the plug connection unit should in particular be understood to mean a structural element which in particular in an interaction with the electronics carrier unit and/or the metallic carrier unit, in at least one operationally ready state, defines a distance between the electronics carrier unit and the metallic carrier unit. Preferentially the spacer element provides a contact surface for the electronics carrier unit and/or the metallic carrier unit. The spacer element can be formed as one piece with the domestic appliance outer housing part. Preferentially, however, the spacer element is formed differently from the domestic appliance outer housing part. Preferentially, the spacer element exhibits, parallel to the plug direction, an extension of at least 2 mm, in particular of at least 5 mm, and preferentially of at least 7 mm. Preferentially, the spacer element exhibits parallel to the plug direction an extension of maximum 30 mm, in particular of maximum 25 mm, preferentially of maximum 20 mm, and to particular advantage of maximum 15 mm. The term "operationally ready state" should be understood in particular to mean an assembled and installed state of the domestic appliance, in which the domestic appliance is ready for operation in the due and proper manner, in particular a heating operation. The term "plug direction of the plug connection unit" should be understood in particular to mean a direction in which a first structural component is moved in a guided manner relative to a second structural component in the creation of a plug connection.

The term "plug connection" should be understood in this connection to mean in particular a positive-fit connection between two structural components, which is in particular established during assembly by a plugging procedure. The expression that the spacer element "distances" the electronics carrier unit and the metallic carrier unit in at least one direction parallel to the plug direction should in particular be understood to mean that a distance, in particular a minimum distance, is defined between the electronics carrier unit and, in particular, the electronics unit and the metallic carrier unit, in the direction parallel to the plug direction, by the spacer element, in particular by a stop on the spacer element. Preferentially, the minimum distance interval between a contact surface of the electronics carrier unit for the electronics unit and the metallic carrier unit in the direction parallel to the plug direction is at least 5 mm, and in particular at least 10 mm. Preferentially, the distance is defined in such a way by the spacer element that, in the event of the absence of the spacer element, another distance, preferentially a smaller distance interval, pertains between the electronics unit and the metallic carrier unit.

By means of such an arrangement, operational safety and reliability can be advantageously increased, and, in particular, pertinent legal regulations and/or standards can be respected, which specify a minimum distance interval between current-conducting components, in particular components of the electronics unit, and metallic components, which in particular are in electrically conductive connection with touchable metallic components. In addition, the equipping of an existing domestic appliance device can be carried out in a simple design structural manner, in particular for the adaptation of a domestic appliance device sold in Europe to the legal regulations and/or standards prevailing in the USA, according to which metallic components must be distanced at least 6.4 mm from current-conducting electrical units.

It is further proposed that in at least one operationally ready state a plug connection pertains between the plug connection unit and the metallic carrier unit. Preferentially, in at least one operationally ready state a direct plug connection exists between the plug connection unit and the metallic carrier unit. As a result, an advantageously secure retention of the metallic carrier unit, and therefore inherently a secure positioning can be attained of the at least one further structural element retained by the metallic carrier unit, in particular of the at least one heating element.

Advantageously, the metallic carrier unit comprises a plug element, formed as a cut-out. The term "cut-out" should be understood here and hereinafter in particular to mean a material cut-out in a component. Preferentially, the cut-out is an internal cut-out. The term "internal cut-out" should be understood in this connection to mean a cut-out which, with the hypothetical introduction of an infinitely long bar of any desired thickness along an introduction device, renders impossible the removal of the bar by a movement of the bar perpendicular to the insertion direction. Preferentially, the internal cut-out, when observed perpendicular to a main plane of extension of the metallic carrier unit, is formed as circular. Preferentially, a maximum extension of the plug element of the metallic carrier unit transverse to the plug direction is at least 1 mm, in particular at least 2 mm, and preferentially at least 3 mm. Preferentially, a maximum extension of the plug element of the metallic carrier unit transverse to the plug direction is maximum 15 mm, in particular maximum 10 mm, and preferentially maximum 7 mm. The term "plug element" should in particular be understood to mean a component involved in the creation of a plug connection, in particular a pin or an cut-out. As a result, an advantageously simple structure of the metallic carrier unit can be achieved.

In a preferred embodiment of the invention it is proposed that the spacer element is formed as a base. The term "base" should be understood in this connection to mean in particular a structural element which forms a contact surface for a further structural element. In particular, the base exhibits a greater extension transverse to the plug direction than a plug element of the plug connection unit, in particular the pin of the plug connection unit. The base can at least essentially exhibit the shape of a prism, a truncated pyramid, or a truncated cone. The expression that the base "at least essentially exhibits the shape of a prism, a truncated pyramid or a truncated cone" should be understood to mean in particular that the base deviates by a volume proportion of maximum 40%, in particular of maximum 30%, for preference of maximum 20%, and to particular advantage of maximum 10%, of a total volume of the shape of a prism, a truncated pyramid, or a truncated cone. In particular, the base can comprise a cut-out, by means of which it deviates from the shape of prism, a truncated pyramid, or a truncated cone. This provides for a spacer element of a simple design. In particular, an advantageously simple equipping of an existing plug connection unit can be achieved.

In a particularly preferred embodiment of the invention it is proposed that the base is formed at least essentially in a cylindrical shape. The expression that the base is "at least essentially in a cylindrical shape" should in particular be understood to mean that the base deviates by a volume proportion of maximum 40%, in particular by maximum 30%, for preference of maximum 20%, and to particular advantage of maximum 10% of a total volume from the shape of a cylinder. In particular, the base can comprise a cut-out, by means of which it deviates from the shape of a cylinder. Preferentially, the base exhibits a height of at least 2 mm, in particular of at least 5 mm, and preferentially of at least 7 mm. Preferentially, the base exhibits a height of maximum 30 mm, in particular of maximum 25 mm, preferentially of maximum 20 mm and particularly preferentially of maximum 15 mm. Preferentially, the base exhibits a maximum extension transverse to the plug direction of at least 2 mm, in particular of at least 4 mm, for preference of at least 6 mm, and to particular advantage of at least 8 mm.

Preferentially, the base exhibits a maximum extension transverse to the plug direction of maximum 30 mm, in particular of maximum 25 mm, for preference of maximum 20 mm, and to particular advantage of maximum 15 mm. In particular, a base surface of the cylinder can deviate from a pure circular shape, and, in particular, also exhibit a shape of an ellipse or any desired shape, in particular curved, which appears appropriate to the person skilled in the art. In particular, the base can comprise a cut-out, by which it deviates from the shape of a cylinder. In particular, a plug element of the plug connection unit, in particular the pin of the plug connection unit, can be guided through the cut-out. As a result, provision can be made for a spacer element of a particularly simple design.

It is further proposed that the plug connection unit exhibits a plug element, which in at least one operationally ready state is immediately adjacent to the base. Preferentially, the plug element is formed as a pin, which preferentially is provided so as to be plugged into the cut-out of the metallic carrier unit in order to establish the plug connection. Preferentially, the pin is formed as circular when observed perpendicular to a main extension plane of the metallic carrier unit. Preferentially, a maximum extension of the plug element of the plug connection unit transverse to the plug direction is at least 1 mm, in particular at least 2 mm, preferentially at least 3 mm, and to particular advantage at least 4 mm. For preference, a maximum extension of the plug element of the plug connection unit transverse to the plug direction is maximum 15 mm, in particular maximum 10 mm, and preferentially maximum 7 mm. Preferentially the plug element of the plug connection unit exhibits a maximum extension in the plug direction of at least 5 mm, in particular of at least 7 mm, preferentially of at least 10 mm, and to particular advantage of at least 12 mm. Preferentially, the plug element of the plug connection unit exhibits a maximum extension in the plug direction of maximum 30 mm, in particular maximum 25 mm, and preferentially of maximum 20 mm. This allows for a plug connection unit with a plug element and a spacer element to be provided in a structurally simple manner. In particular, the plug element and the spacer element can be embodied in one piece, as a result of which assembly and installation can be advantageously simplified and components spared. Alternatively, the spacer element and the plug element can be present as separate components, wherein, in particular, the plug element can be molded in one piece on the domestic appliance outer housing part.

If the domestic appliance device exhibits at least one domestic appliance outer housing part, to which the plug connection unit is secured in at least one operationally ready state, a secure retention of the metallic carrier unit in the outer housing of the domestic appliance can be ensured in a structurally simple manner. In this situation, the plug connection unit can be secured to the domestic appliance outer housing part by any type of connection which appears useful to the person skilled in the art, in particular by metallurgical joining, preferably by welding, soldering, and/or adhesive bonding, in a positive fit manner, preferentially by riveting, and/or in non-positive fit manner, preferentially by clamping. In particular, the plug connection unit can also be formed as one piece on the domestic appliance outer housing part. Preferentially, however, the plug connection unit is formed as a separate structural unit. To particular advantage, the plug connection unit is secured to the base at the domestic appliance outer housing part.

Advantageously, the domestic appliance outer housing part exhibits at least one cut-out, in which at least a part of the plug connection unit is arranged. Preferentially, the spacer element of the plug connection unit is arranged at least partially in the cut-out. The cut-out can in particular be a blind hole in the domestic appliance outer housing part. Preferentially, however, the cut-out is formed as an internal cut-out in the domestic appliance outer housing part. Preferentially, the part of the plug connection unit, in particular the spacer element, is arranged at least essentially free of play in the cut-out. To particular advantage, the cut-out features a circular cross-section, in which the cylindrically shaped spacer element is arranged, in particular at least essentially free of play. As a result, advantageously, firm securing of the plug connection unit to the domestic appliance outer housing part can be achieved.

If the part of the plug connection unit in the cut-out is held at least partially by positive fit, then to particular advantage a secure and in particular sturdy securing of the plug connection unit to the domestic appliance outer housing part can be achieved. Preferentially, the part of the plug connection unit, in particular the spacer element, is held in the cut-out in at least one direction with a rear grip. To particular advantage, the part of the plug connection unit is connected to the domestic appliance outer housing part by means of a rivet connection. In particular, the part of the plug connection unit can additionally be held in the cut-out by metallurgical joining and/or by force closure, in particular by friction resistance. As a result, the securing of the plug connection unit can be improved still further.

It is further proposed that the electronics carrier unit is secured to the domestic device outer housing part directly or only by means of a securing unit formed differently from the metallic carrier unit. The term "securing unit" should be understood to mean a unit which preferentially differs from the plug connection unit, which exhibits at least one securing means and preferentially exactly one securing means, by means of which the electronics carrier unit is secured in at least one operationally ready state. This allows for an advantageously simple and nevertheless secure retention of the electronics unit in the outer housing of the domestic appliance to be achieved. In addition, by positioning the metallic carrier unit relative to the electronics carrier unit above the domestic appliance outer housing part, a structural design can be advantageously simplified. Components and material can also be saved.

In a further embodiment of the invention, it is proposed that the metallic carrier unit is designed as an inductor carrier unit, which is provided such as to carry at least one inductor in at least one operationally ready state. As a result, reliable operation of the inductor can be guaranteed. Energy losses can be minimized by using a non-magnetic metal for the metallic carrier unit, Further advantages are derived from the following drawing description. An exemplary embodiment of the invention is represented in the drawing. The drawings, the description, and the claims contain numerous features in combination. The person skilled in the art will purposefully also consider the features individually, and integrate them to form advantageous further combinations.

DETAILED DESCRIPTION OF EXEMPLARY EMBODIMENTS OF THE PRESENT INVENTION

Figure 1:
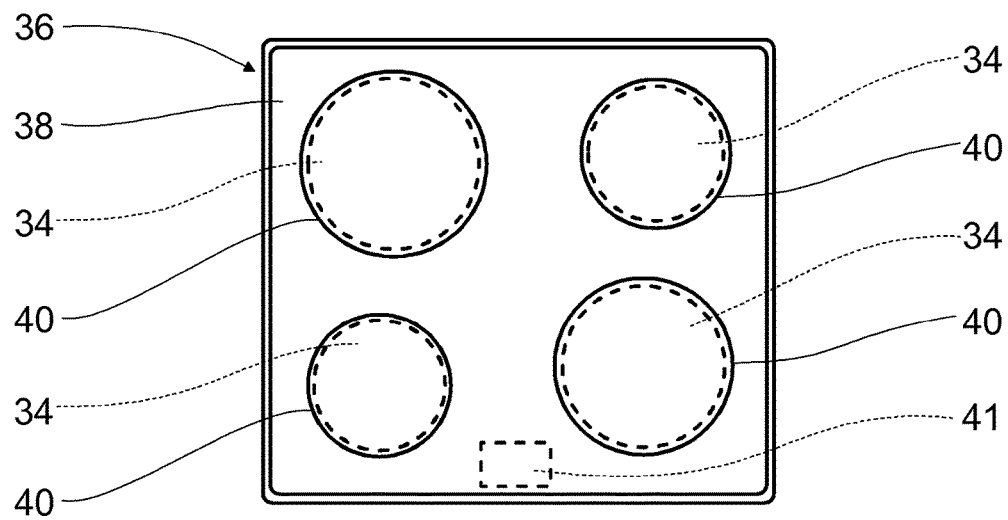
FIG. 1 a domestic appliance designed as a cooktop, with a domestic appliance device according to the invention, in a view from above, FIG. 2 the domestic appliance device with an electronics carrier unit, a plug connection unit, a domestic appliance outer housing part, and a metallic carrier unit, in an isometric representation, FIG. 3 the domestic appliance device with the electronics carrier unit, the plug connection unit, and the domestic appliance outer housing part, in an isometric representation, FIG. 4 a securing of the plug connection unit to the domestic appliance outer housing part in a sectional representation, FIG. 5 the securing of the plug connection unit to the domestic appliance outer housing part, in a isometric representation, and FIG. 6 a part of the metallic carrier unit, in an isometric representation.

FIG. 1 shows a domestic appliance formed as a cooktop 36 in a view from above. The cooktop 36 comprises a hotplate 38. The hotplate 38 exhibits a basic body made of a glass ceramic, on which heating zones 40 are marked in the conventional manner. The hotplate 38 is arranged horizontally in an operationally ready state, and provided for the placement of cooking utensils. Arranged beneath the hotplate 38 are inductors 34, indicated by broken lines in FIG. 1. Each inductor 34 is allocated to one of the heating zones 40. In an operational state, in which it is intended that a cooking utensil placed on the heating zone 40 should be heated, the inductor 34 allocated to the heating zone 40 is flowed through by high-frequency alternating current, as a result of which a high-frequency magnetic alternating field occurs, which induces electrical eddy currents in a base of the cooking utensil. The cooktop 36 further exhibits a user interface 41 arranged beneath the hotplate 38 (shown in FIG. 1 as a broken line). The user interface 41 comprises at least one display unit and at least one sensor unit to provide proof of a contact on at least one user surface marked on the hotplate 38 (not represented in FIG. 1). The cooktop 36 is provided for sale in the USA.

Figure 2:
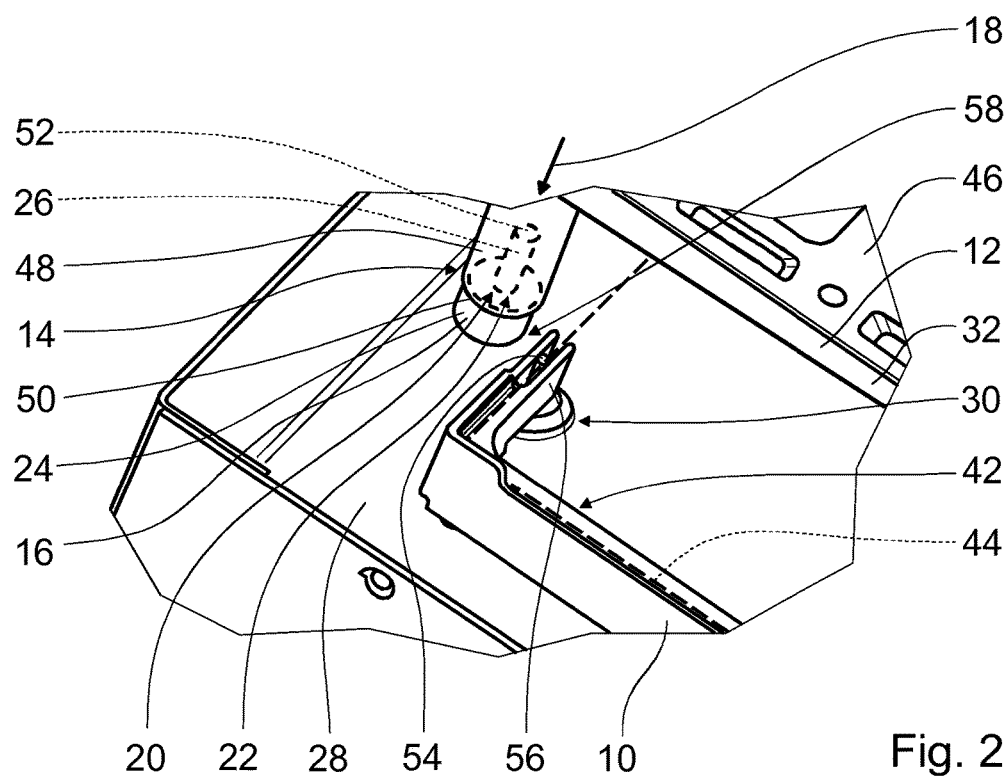

FIG. 2 shows an isometric representation of a domestic appliance device according to the invention, of the domestic appliance formed as a cooktop 36, with the hotplate 38 dismantled. The domestic appliance device comprises an electronics carrier unit 10, a metallic carrier unit 12, and a plug connection unit 14. The electronics carrier unit 10 exhibits an accommodation area 42 for an electronics unit 44 of the domestic appliance, which, for better overview, is only represented in FIGS. 2 and 3 schematically and by way of broken lines. The electronics carrier unit 10 is formed as one piece as a plastic injection molding. The electronics carrier unit 10 exhibits an extension parallel to a plug direction 18 of the plug connection unit 14, which is 7.5 mm greater than a corresponding extension of an electronics carrier unit of a domestic appliance provided for the European market. The electronics carrier unit 10 exhibits securing means for retaining the electronics unit 44 (not shown in FIGS. 2 and 3). As securing means, any desired securing means which seem useful to the person skilled in the art come into consideration, but preferentially catch means. The electronics unit 44 comprises a power electronics unit, by means of which the inductors 34, in an operational state, are supplied in a known manner with the high-frequency alternating current.

The metallic carrier unit 12 is formed as an inductor carrier unit 32. The metallic carrier unit 12 exhibits securing means for retaining the inductors 34. Here too, any desired securing means which seem useful to the person skilled in the art come into consideration, but preferentially threaded holes or cut-outs for screw connections. The metallic carrier unit 12 is provided so as to carry all the inductors 34 of the cooktop 36. The metallic carrier unit 12 is made as one piece from aluminum. The metallic carrier unit 12 comprises a carrier plate 46 for securing the inductors 34, and a support leg 48 at each corner of the carrier plate 46. The length of the support legs 48 is 35.55 mm in each case. The carrier plate 46 in an operationally ready state is arranged parallel to a main extension plane of the electronics unit 44. The carrier plate 46 exhibits, in an operationally ready state, a minimum distance of 10.6 mm from a contact surface of the electronics unit 44 on the electronics carrier unit 10. The main extension plane of the electronics unit 44 is defined by a printed circuit board of the electronics unit 44, and is arranged at least largely parallel to the hotplate 38. By means of the support legs 48, the carrier plate 46 is arranged, in an operationally ready state of the cooktop 36, between the electronics unit 44 and the hotplate 38. The support legs 48 run in this situation at least partially laterally next to the electronics unit 44. The plug connection unit 14, in an operationally ready state, enters into a plugged connection with the metallic carrier unit 12. To achieve this, the mechanical carrier unit 12 comprises, at each lower end 50 of the support legs 48, a plug element 22, formed as a cut-out 20. The cut-out 20 runs inside the support legs 48 and parallel to them.

FIG. 3 shows an isometric representation of the domestic appliance device with the hotplate 38 dismantled and the metallic carrier unit 12 dismantled. The plug connection unit 14 comprises a plug element 26, formed as a pin 52. The pin 52 exhibits a length of 13.3 mm. The pin 52 exhibits a diameter of 4 mm. In an operationally ready state, the pin 52 engages in positive fit into the cut-out 20. An insertion depth of the pin 52 into the cut-out 20 is determined by a spacer element 16 of the plug connection unit 14. Accordingly, the spacer element 16 distances the electronics carrier unit 10 from the metallic carrier unit 12 in a direction parallel to the plug direction 18 of the plug connection unit 14. A section of the spacer element 16, facing the metallic carrier unit 12, is formed as a cylindrical base 24. The base 24 exhibits a height of 7.5 mm. The base exhibits a diameter of 8 mm. The pin 52 is formed directly at the base 24 as one piece. The plug connection unit 14 is therefore formed as one piece. The plug connection unit 14 is made of stainless steel. Since both the plug connection unit 14 and also the electronics carrier unit 10 are secured by means of a securing unit 30 to a domestic appliance outer housing part 28 of the domestic appliance device, a relative position of the electronics carrier unit 10 to the metallic carrier unit 12 is determined in a direction perpendicular to a plug direction 18 of the plug connection unit 14. The plug connection unit 14 can be secured to the domestic appliance outer housing part 28 in any manner which appears useful to the person skilled in the art. In the present case, the plug connection unit 14 and in particular the spacer element 16 of the plug connection unit 14, is riveted to the domestic appliance outer housing part 28. Likewise, the securing unit 30 can be formed in any desired manner which appears useful to the person skilled in the art. In the present case, the securing unit 30 comprises a retaining clip 54, represented solely schematically, which in an assembly arrangement is plugged into a retaining bracket 56 of the electronics carrier unit 10. The domestic appliance outer housing part 28 consists of galvanized steel.

FIG. 4 shows a sectional representation of the plug connection unit 14 mounted at the domestic appliance outer housing part 28. FIG. 5 shows a plan view onto the plug connection unit 14 mounted at the domestic device outer housing part 28. The domestic appliance outer housing part 28 exhibits a cut-out 58, in which a part of the plug connection unit 14 is arranged. The cut-out 58 in this situation is formed as a continuous inner cut-out in the domestic appliance outer housing part 28. The part of the plug connection unit 14 arranged at the cut-out 58 is the spacer element 16. The cut-out 58 is formed as circular in cross-section, wherein a diameter of the cut-out 58 is somewhat smaller than the diameter of the base 24. The spacer element 16 is retained in the cut-out 58 by positive fit. The spacer element 16 exhibits for this purpose, connecting directly to the base 24, a rivet connection element 60, which fits in positive fit into the cut-out 58. When the spacer element 16 is fitted to the domestic appliance outer housing part 28, the rivet connection element 60 is irreversibly deformed. During assembly, the rivet connection element 60 of the spacer element 16 of the plug connection unit 14 is initially introduced in the plug direction 18 into the cut-out 58. The rivet connection element 60 is then deformed, as a result of which the rivet connection element 60 forms a collar 62, which fixes the plug connection unit 14 the domestic appliance outer housing part 28 with a rear grip.

Figure 6:
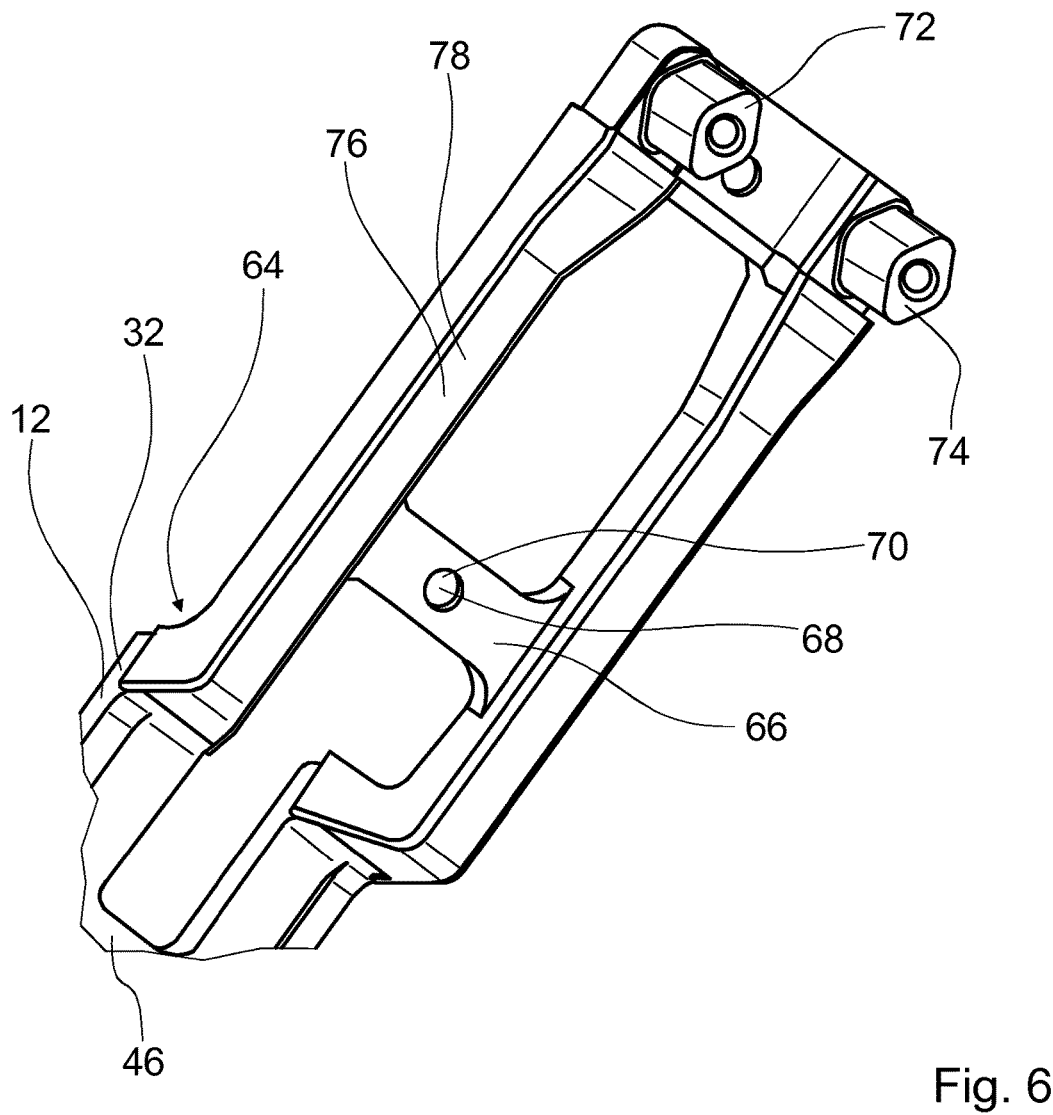

FIG. 6 shows a part of the metallic carrier unit 12 in an isometric representation. This involves the part of the metallic carrier unit 12 which, in an operationally ready state of the cooktop 36 is arranged beneath the user interface 41. In an area of the user interface 41, the carrier unit 12 exhibits a step arrangement 64, in order to provide sufficient structural space for the user interface 41 beneath the hotplate 38. The metallic carrier unit 12 exhibits, at a transverse web 66, a securing element 68, in particular in the form of a catch cut-out 70, for securing the user interface 41. Between the step arrangement 64 and the adjacent support legs 72, 74 of the metallic carrier unit 12, a minimum distance is produced between the metallic carrier unit 12 and the electronics unit 44 which is in partially smaller than is required by US regulations (not shown in FIG. 6). Accordingly, the metallic carrier unit 12 is covered with an insulation layer 76 between the step 64 and support legs 72, 74. The insulation layer 76 is a rubber layer 78. The insulation layer 76 surrounds the metallic carrier unit 12 between the step 64 and the support legs 72, 74, and in particular also the transverse web 66, on all sides.

As an alternative or in addition, a spacer element can also be retained by a frictional lock connection in an cut-out of a domestic appliance outer housing part. In particular, a spacer element can be retained by press fit in a cut-out of a domestic appliance outer housing part. In addition, a domestic appliance device can also comprise several metallic carrier units, wherein each metallic carrier unit is provided in order to carry precisely one inductor or several inductors, in particular two inductors. Moreover, a domestic appliance device can also comprise several electronics carrier units, wherein each electronics carrier unit is provided so as to carry precisely one or several electronics units. An electronics carrier unit can also consist of several individual components, which in an interaction provide retention for an electronics unit. In particular, in the event of the sale of a domestic appliance with a domestic appliance device according to the invention in another country, dimensions of an electronics carrier unit, a metallic carrier unit, and a plug connection unit, in particular of a spacer element of the plug connection unit, can be adapted accordingly, in order to respect pertinent legal regulations and/or standards of the country concerned.

What is claimed is:

1. A domestic appliance device, comprising:
   a domestic appliance outer housing;
   an electronics carrier unit attached to the domestic appliance outer housing;
   a metallic carrier unit having a carrier unit plug element;
   a plug connection unit attached to the domestic appliance outer housing, the plug connection unit having a spacer element for height and a connection unit plug element, wherein the connection unit plug element engages the carrier unit ping element in an operationally ready state, the plug connection unit separates the metallic carrier unit from the domestic appliance outer housing and the electronics carrier, in the operationally ready state, in a direction parallel to a plug direction of the plug connection unit, and
   the plug connection unit is a separate element from the domestic appliance outer housing and is secured in a cut-out of the domestic appliance outer housing; and
   a securing unit securing the plug connection unit to the domestic appliance outer housing part.

2. The domestic appliance device of claim 1, wherein the connection unit plug element and the carrier unit plug element provide a plug connection between the plug connection unit and the metallic carrier unit in the at least one operationally ready state.

3. The domestic appliance device of claim 2, wherein the metallic carrier unit plug element is a receptacle.

4. The domestic appliance device of claim 1, wherein the spacer element has a base.

5. The domestic appliance device of claim 4, wherein the base is constructed at least essentially cylindrically.

6. The domestic appliance device of claim 4, wherein the connection unit plug element is arranged immediately adjacent to the base.

7. The domestic appliance device of claim 1, wherein the plug connection unit is held in the cut-out at least partially by positive fit.

8. The domestic appliance device of claim 1, wherein the electronics carrier unit is secured directly to the domestic appliance outer housing part.

9. The domestic appliance device of claim 1, further comprising the securing unit also securing the electronics carrier unit to the domestic appliance outer housing part, said securing unit formed differently from the metallic carrier unit.

10. The domestic appliance device of claim 1, wherein the metallic carrier unit is formed as an inductor carrier unit, which is provided such as to carry at least one inductor in the operationally ready state.

11. A domestic appliance, comprising a domestic appliance device, the domestic appliance device comprising:
   a domestic appliance outer housing;
   an electronics carrier unit attached to the domestic appliance outer housing;
   a metallic carrier unit having a carrier unit plug element;
   a plug connection unit attached to the domestic appliance outer housing, the plug connection unit having a spacer element for height and a connection unit plug element, wherein the connection unit plug element engages the carrier unit plug element in an operationally ready state, the plug connection unit separates the metallic carrier unit from the domestic appliance outer housing and the electronics carrier, in the operationally ready state, in a direction parallel to a plug direction of the plug connection unit, and the plug connection unit is a separate element from the domestic appliance outer housing and is secured in a cut-out of the domestic appliance outer housing; and a securing unit securing the plug connection unit to the domestic appliance outer housing part.

12. The domestic appliance of claim 11, constructed in the form of a cooktop.

13. The domestic appliance of claim 11, wherein the connection unit plug element and the carrier unit plug element provide a plug connection between the plug connection unit and the metallic carrier unit in the at least one operationally ready state.

14. The domestic appliance of claim 11, wherein the metallic carrier unit plug element is a receptacle.

15. The domestic appliance of claim 11, wherein the spacer element has a base.

16. The domestic appliance of claim 15, wherein the base is constructed at least essentially cylindrically.

17. The domestic appliance of claim 15, wherein the connection unit plug element is arranged immediately adjacent to the base.

18. The domestic appliance of claim 11, wherein the plug connection unit is held in the cut-out at least partially by positive fit.

19. The domestic appliance of claim 11, wherein the electronics carrier unit is secured directly to the domestic appliance outer housing part.

20. The domestic appliance device of claim 11, further comprising the securing unit also securing the electronics carrier unit to the domestic appliance outer housing part, said securing unit formed differently from the metallic carrier unit.

21. The domestic appliance of claim 11, wherein the metallic carrier unit is formed as an inductor carrier unit, which is provided such as to carry at least one inductor in the operationally ready state.

22. The domestic appliance device of claim 1, wherein the spacer element is adapted to fix a position of the electronics carrier unit and the metallic carrier unit relative to each other such that the spacer separates the electronics carrier unit and the metallic carrier unit a distance from each other.

23. The domestic appliance device of claim 1, wherein a rivet connection element is positioned within the cut-out of the domestic appliance outer housing, such that after assembly of the spacer element of the plug connection unit into the cut-out, the rivet connection is deformed to fix the plug connection unit into the domestic outer housing.

24. The domestic appliance device of claim 23, wherein the deformed rivet connection element forms a collar.

25. The domestic appliance device of claim 3, wherein the connection unit plug element is a pin, and the receptacle is configured to receive the pin.

\* \* \* \* \*